July 17, 1934.  E. L. THEARLE  1,967,163
MEANS FOR DYNAMICALLY BALANCING MACHINE TOOLS
Filed May 26, 1933  2 Sheets-Sheet 1
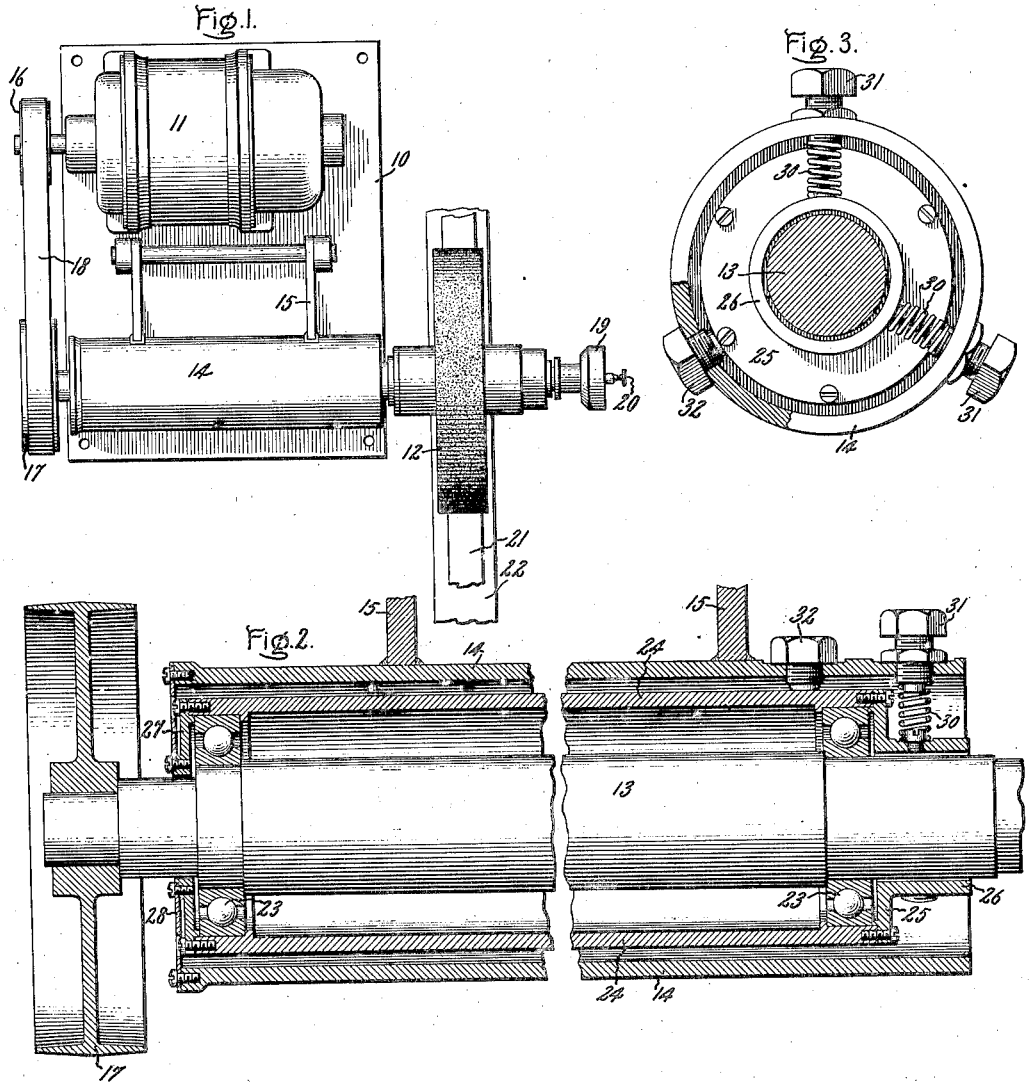
Inventor:
Ernest L. Thearle,
by Harry E. Dunham
His Attorney.

July 17, 1934.　　　　E. L. THEARLE　　　　1,967,163
MEANS FOR DYNAMICALLY BALANCING MACHINE TOOLS
Filed May 26, 1933　　　2 Sheets-Sheet 2
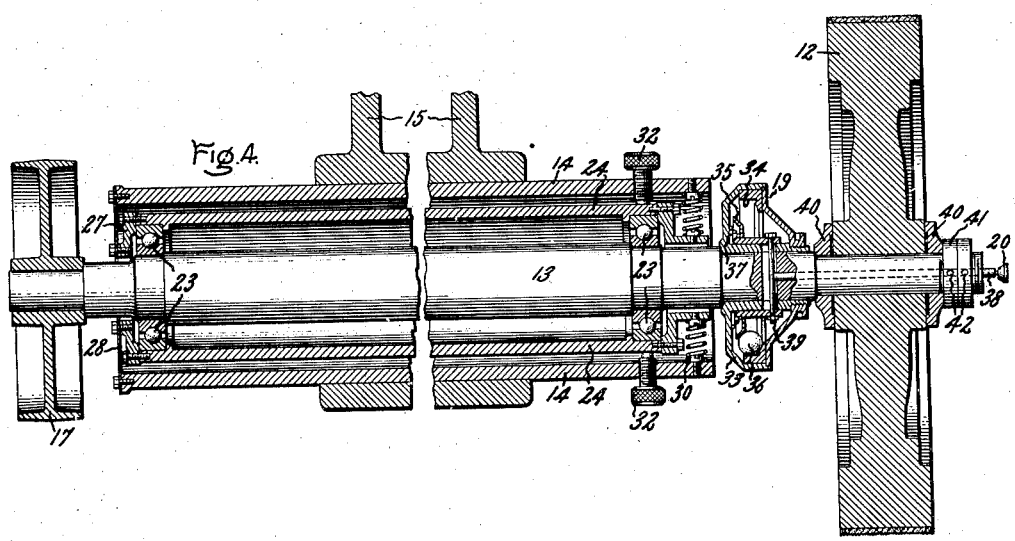
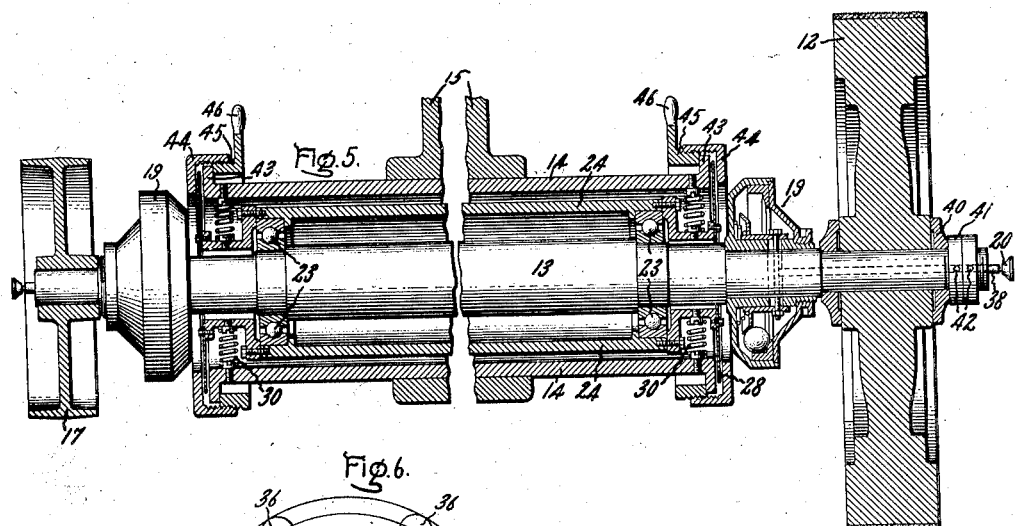
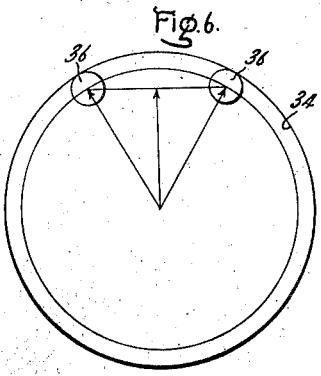
Inventor:
Ernest L. Thearle,
by Harry E. Dunham
His Attorney.

Patented July 17, 1934

1,967,163

UNITED STATES PATENT OFFICE 1,967,163

MEANS FOR DYNAMICALLY BALANCING MACHINE TOOLS

Ernest L. Thearle, Schenectady, N. Y., assignor to General Electric Company, a corporation of New York Application May 26, 1933, Serial No. 672,943

10 Claims. (Cl. 51—169)

There are numerous types of machines in use, notably grinding and polishing machines and certain kinds of wood working machines which require for their operation a tool having a relatively high rotative speed. Such tools are made in a variety of ways and of different materials. Unless such tools are carefully balanced, they cause, when in operation, objectionable vibrations of the machine. As such tools wear when in use, it is necessary to make replacements from time to time and each replacement tool should to obtain the best results be balanced dynamically. Also it may happen that a tool after a limited amount of use gets out of balance for some reason or other and requires rebalancing. A tool which is out of balance, even by a small amount, especially in some grinding operations, is highly objectionable because it interferes with the accuracy of the operation. Even though the tool be quite accurately balanced before being mounted in place in a machine there may be a lack of balance because of some condition existing in the machine itself.

My invention has for its object the provision in a machine of the character above referred to of a mounting and dynamic balancing means for a rotating tool which is built into and forms a permanent part of the machine utilizing the tool, to the end that independent dynamic balancing of the tool is no longer required, and whereby by a very simple means the tool can be dynamically balanced at any time without being removed from the machine, and this by the machine operator who need know nothing of the theory of dynamic balancing nor the application of such theories.

For a consideration of what I believe to be novel and my invention, attention is directed to the accompanying description and the claims appended thereto.

In the accompanying drawings, which are illustrative of my invention, Fig. 1 is a plan view of a simple form of grinding machine and balancing head; Fig. 2 is a longitudinal section of the means for supporting the driving shaft of a rapidly rotating tool; Fig. 3 is a detail view in cross section of one end of shaft mounting; Fig. 4 is a slight modification in which the balancing head is located between the rotating tool and the shaft support; Fig. 5 is a further modification in which two balancing heads are provided and Fig. 6 is a diagram illustrative of the action of the balancing weights.

10 indicates a base or other foundation upon which is mounted an electric motor 11 capable of driving the rotating tool 12 at the desired speed. The particular structure of the tool is immaterial. It may be constructed in any well known way, and may have an abrasive peripheral surface as for grinding and polishing metal or cutting edges or surfaces for wood working. The tool or grinding wheel 12 is mounted on a horizontal shaft 13 located within a housing 14, and the latter is pivotally supported from the base by arms 15. In this case, the weight of the tool 12, shaft and housing are utilized to press the tool downwardly on the stock to be ground, polished or otherwise treated. If this feature is not required, the housing 14 may be secured directly to the base. On one end of the rotor of the motor is a pulley 16 and on the shaft 13 a pulley 17, the two being connected by a suitable belt 18. 19 indicates the balancing head which contains movable weights for balancing purposes and will be referred to later on. The head is on the outer end of the shaft of tool 12, and the weights are controlled by the actuator 20. Under the wheel is a strip of steel stock 21 which is to be ground or polished, and which is moved lengthwise by a traveling belt 22.

Referring more especially to Fig. 2, the driving shaft 13 has two ball bearings 23 in spaced relation with the inner races seated against shoulders formed on the shaft. The outer ball races are seated against shoulders formed on the inner surface of the tubular member 24. The right-hand bearing is held in place by a head 25 which has a central sleeve or hub 26 through which the shaft 13 freely extends, there being a suitable and necessary clearance between adjacent surfaces. To the left-hand end of the tubular member 24 is secured a head 27 which in addition to holding the ball bearing in place forms a part of the connecting link between the member and the housing 14. The other part of the link is formed by the relatively thin flexible disk or plate 28. Such a disk has great rigidity in a radial direction and is relatively flexible in an axial direction. The maximum flexibility is obtained by securing the rim of the disk to the housing as by screws, and the central part of the disk to the head 27 in the same manner. The disk and associated parts form what is in effect a fulcrum for one end of the tubular member 24, and likewise for the shaft 13. The center of movement of the shaft and member is in a plane perpendicular to the shaft and at the point of intersection of the disk and the shaft axis whereby the outer end of the shaft is permitted to vibrate with two degrees of freedom. To enable a dynamic balance to be effected by the balancing head 19 when the shaft 13 is rotating at high speed, it is necessary to provide yielding supports for the end of the shaft remote from the fulcrum or pivot to permit said end to vibrate if the wheel is out of balance. In order to utilize the tool after it is balanced it is desirable to use unyielding means to hold the shaft 13, tubular member 24 and housing 14 in fixed relation. The yielding support is found in three relatively stiff compression springs 30 spaced 120° apart and supported at their outer ends by adjustable screws 31, the latter having suitable clamping nuts. The inner ends of the spring are held in their proper positions by radial pins or screws mounted in the sleeve 26. The unyielding means is found in three adjustable screws 32 spaced 120° apart and carried by the housing 24. During balancing, these screws are backed away from the member 24 to let it vibrate freely with the shaft 13 and wheel 12 about the fulcrum at the left-hand end.

The balancing head 19 may be of substantially the same construction as the balancing head B of my Patent 1,876,524 dated Sept. 6, 1932. Its use differs in that it forms a permanent part of the machine and remains so during its normal intended operation. The head is best illustrated in Figs. 4, 5 and 6. It comprises a casing 33 which is snugly fitted on the shaft 13 to turn therewith. Inside of the casing is a ball race 34 concentric with the axis of the casing and shaft. Inside of the casing is a clutch 35 having a central hub arranged to slide on the hub of the casing and an outwardly beveled flange adapted alternately to engage and release the hardened steel balls 36 of which two or more may be provided. When the balls are released and the shaft 13 is turning at normal speed, they are free to move angularly in the race 34, and adjust themselves to such positions as to compensate for the lack of balance in the rotating wheel 12 and associated parts. In other words to move to the lighter side of the rapidly revolving structure. In back of the clutch is a coiled spring 37 normally pressing the clutch member into engagement with the balls to hold them in place. The clutch is opened by means of the push rod 38, actuator 20 and cross pin 39 located in a diametrical slot in the shaft 13. The outer ends of the pin are seated in the hub of the clutch member. A light pressure on the handle 20 of the rod 38 is sufficient to release the balls and the spring 37 will cause the clutch to re-engage the balls.

Assuming that a new grinding wheel has been mounted on and secured to the shaft or it is desired to rebalance, the screws 32 are backed away from the tubular member 24 by a small amount but one sufficient to let the shaft 13 and wheel 12 vibrate about the flexible disk 27 as a fulcrum. The shaft should be rotated above the resonant or critical speed of the rotating parts. The next step is to release the balls by exerting pressure on the push rod 38, and they will then seek the side of the head and corresponding to the lighter side of the grinding wheel and rotating structure and may, for example, assume the position shown in Fig. 6. After the balls have assumed their respective positions, an action which takes place immediately after they are released, pressure is removed from the push rod 38 and the balls clutched in their adjusted positions. The next step is to return the screws 32 to their proper positions, care being exercised not to force the tubular member from its position as determined by the three centralizing springs 30.

In my aforesaid patent, the data obtained from balls and their respective positions is utilized to determine the amount of weight to be added to the armature or other body being balanced but in the present instance no data need be considered or calculations made or weight added or subtracted from any part of the rotating structure. The only thing that need be considered is that of making the balls or weights initially heavy enough to take care of any lack of balance.

In Fig. 1 the balancing head is on the outer end of the shaft and for many applications such an arrangement is desirable although it calls for removing the head before the grinding wheel or tool can be removed unless the tool is made with a fixed central part larger than the balancing head and a removable outer part. For other applications, it is better to have the balancing head between the wheel 12 and the driving mechanism and this is particularly true where frequent renewals of wheels are necessary. It also has the advantage of being better protected from injury. Such a construction is shown in Fig. 4 where the balancing head is permanently mounted on a relatively thick part of the shaft 13 and between the end of the housing 14 and the wheel. The wheel is held between collars 40 and retained by a nut 41 and a lock nut, both having holes 42 to receive a spanner wrench. The construction of the other parts is the same as previously described.

In Fig. 5 both ends of the tubular member 24 are arranged to act as fulcra which requires that both shall be releasable instead of one as in Fig. 2. Also both ends of the tubular member 24 have centralizing springs 30 of the same character as those previously described and having the same function. The balancing heads are also of the same construction as those previously described and operate in the same manner. Because it is desired to balance each end of the moving mechanism separately, the disks 28 which are fastened to the ends of the member 24, instead of being permanently fastened to the housing 14 at their peripheral edges are free. To permit of clamping the edges of the disks and releasing them, each end of the housing is provided with an outturned flange 43 which is enclosed in a cup-shaped element 44 having an internal screw thread. Mounted to turn on the housing is a nut 45 having external threads to engage those on the element 44. The nut is made in two parts to permit it to be slipped into place over the flange 43, and is provided with suitable internal projections or surfaces to engage and center it on the housing. The nut is also provided with a handle 46 for turning it. As the nut is turned in one direction, say right-handedly, it moves the cup-shaped element in a direction to cause the peripheral portion of the disk 28 to be clamped between it and the flange 43. When the right-hand disk is in this position and the left-hand disk and member 24 free, the balancing head on the left-hand end is active and its balls when released will adjust themselves in the manner previously described. Releasing the right-hand disk 28 and clamping the left-hand one permits the right-hand balancing head to function. The arrangement of the two balancing heads 19 is desirable where the grinding wheel or other tool is located in some position between the planes of the ball bearings.

It is particularly to be noted that the shaft 13, tubular member 24 and housing 14 are in telescoping relation which has the great advantage of making the machine short in the direction of the length of the shaft 13. Moreover, the arrangement described permits of the shaft bearings being widely spaced which is important where the tool is mounted on the free end of the shaft.

What I claim as new and desire to secure by Letters Patent in the United States is:

1. A machine of the character described comprising a rotating shaft, a tool mounted on the shaft and rotated thereby, bearings for the shaft, a tubular member surrounding the shaft, a housing, a fulcrum support for one end of the member carried by the housing, a releasable support for the other end of the member, an elastic centralizing suspension for the last mentioned end of the member operable when the support is released, and a balancing head permanently located on the shaft between the tool and a bearing, said head comprising rolling weights which when released seek the portion of the head corresponding to the lighter side of the shaft and tool to effect a dynamic balance thereof, a clutch for releasably holding the rolling weights, and a means for actuating the clutch from the end of the shaft outside of the tool.

2. A machine of the character described comprising a housing, a base supporting the housing, a tubular member located within the housing, a rotating shaft within the member, a tool mounted on the shaft, bearings for the shaft carried by the member, a fulcrum supporting one end of the member carried by the housing, a normally fixed support for the other end of the member carried by the housing, an elastic centralizing support for the last mentioned end of the member operable when the fixed support is released, and a balancing head mounted on the shaft for rotation with it and the tool, said head having rolling weights which when released seek the lighter side of the shaft and tool to effect dynamic balance thereof, and a clutch for releasing the weights to permit them to adjust themselves and subsequently to clamp them in adjusted position.

3. A machine of the character described comprising a housing, a tubular member, a rotating shaft, said housing, member and shaft being in telescopic relation, a tool mounted on the shaft, bearings for the shaft carried by the member, a flexible disk attached to the housing and member and forming a fulcrum support for one end of the member, supports for the other end of the member whereby said other end alternately may be rigidly and elastically supported, and a balancing head mounted on the shaft and operable when the tool is in use, said head having rolling weights which when released seek the lighter side of the shaft and tool to effect dynamic balance thereof, and a clutch for releasing the weights to permit them to adjust themselves and subsequently to clamp them in adjusted position.

4. A machine of the character described comprising a housing, a tubular member, a rotating shaft, said housing, member and shaft being in telescopic relation, a tool mounted on the shaft, bearings for the shaft carried by the member, a fulcrum means attached to the adjacent ends of the member and housing, screws for centralizing the member in the housing, springs for centralizing the member in the housing when the screws are inactive, and a balancing head mounted on the shaft adjacent the tool, said head having a pair of balls which when released seek the lighter side of the shaft and tool to effect dynamic balance thereof, a clutch for alternately releasing and clamping the balls, and an actuator for the clutch located on the outer side of the tool.

5. A machine of the character described comprising a rotating shaft, a tool mounted on the shaft for rotation therewith, bearing means for the shaft, a tubular member carrying the bearing means, a housing surrounding the member, a fulcrum means located in a plane perpendicular to the axis of the shaft and comprising a head secured to the member, and a flexible disk secured to the head near the shaft and at its periphery to the housing to permit the opposite end of the shaft and member to vibrate with two degrees of freedom, releasable means normally supporting the member in concentric relation with the housing, elastic centralizing means for supporting the member when the means are released, and a balancing head permanently mounted on the shaft and comprising rolling weights and a releasable clutch for the weights, said weights being movable to the lighter side of the revolving parts when the elastic centralizing means are active and the releasable means inactive.

6. A machine of the character described comprising a shaft, bearings therefor, a tool mounted on the shaft, a driving means for the shaft, a tubular member enclosing the shaft and supporting the bearings, a housing inclosing the member, a flexible disk arranged to connect one end of the member to the housing, means for fixedly supporting the opposite end of the member with respect to the housing, an elastic suspension adjacent said means which is normally inactive but which supports the member and shaft when the means are inactive and permits one end of the shaft and tool to vibrate independently of the housing, and a balancing head rotated by the shaft and comprising freely moving weights and a clutch for alternately releasing the weights and clamping them in adjusted position.

7. A machine of the character described comprising a base, a shaft, a tool driven thereby, bearings for the shaft, support for the bearings, a housing for the support, a means supporting the shaft by the housing which permits one end of the shaft and the tool to vibrate within the housing under conditions of unbalance in the tool, a balancing head mounted on the shaft, said head having freely movable weights and a releasable clutch for the weights, and a pivotal support for the housing carried by the base.

8. A machine of the character described comprising a rapidly rotating shaft, a tool driven thereby, bearings for the shaft, a tubular member enclosing the shaft and supporting the bearings, a housing for the member, the shaft, member and housing being in telescopic relation, releasable fulcrum means located at each end of the member, each comprising a head secured to the member and a disk secured near its center to the head and at its periphery to the housing, whereby either end of the member can be secured to the housing at will to permit the other end to vibrate due to unbalance in the tool, an elastic means located at each end of the member adjacent a fulcrum means, and a pair of balancing heads permanently mounted on the shaft adjacent the ends of the tubular member, each head comprising a casing, freely movable weights therein and a clutch whereby the weights alternately may be released and clamped in adjusted positions.

9. A machine of the character described comprising a base, a rapidly rotating shaft, a tool driven thereby, a housing supported by the base, a tubular member located within the housing, bearings holding the shaft in concentric relation with the member, fulcrum means for holding one end of the member in definite concentric relation to the housing and permitting the other end of the member to vibrate, a balancing head permanently mounted on the shaft, said head having self adjusting weights and a controllable clutch therefor, means for clamping portions of the member and housing remote from the fulcrum in the relation established by the weights.

10. A machine of the character described comprising a base, a housing, a tubular member and a shaft all arranged in telescopic relation, fulcrum means connecting corresponding ends of the housing and member, releasable means supporting the opposite end of the member from the housing, a balancing head permanently mounted on the shaft, said head having self adjusting weights and a controllable clutch therefor, and a tool mounted on the shaft and rotated thereby.

ERNEST L. THEARLE.